United States Patent
Mönig et al.

(10) Patent No.: US 11,920,400 B2
(45) Date of Patent: Mar. 5, 2024

(54) SENSOR DEVICE FOR A VEHICLE

(71) Applicant: Huf Hülsbeck & Fürst GmbH & Co. KG, Velbert (DE)

(72) Inventors: Stefan Mönig, Schwelm (DE); Sven Hild, Hagen (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 632 days.

(21) Appl. No.: 17/254,575

(22) PCT Filed: Jun. 18, 2019

(86) PCT No.: PCT/EP2019/065924
§ 371 (c)(1),
(2) Date: Dec. 21, 2020

(87) PCT Pub. No.: WO2020/002033
PCT Pub. Date: Jan. 2, 2020

(65) Prior Publication Data
US 2021/0246708 A1    Aug. 12, 2021

(30) Foreign Application Priority Data

Jun. 28, 2018  (DE) ..................... 10 2018 115 581.6

(51) Int. Cl.
| | |
|---|---|
| *E05F 15/73* | (2015.01) |
| *B62D 33/027* | (2006.01) |
| *B62D 33/03* | (2006.01) |
| *E05F 15/40* | (2015.01) |

(52) U.S. Cl.
CPC .......... *E05F 15/73* (2015.01); *B62D 33/0273* (2013.01); *B62D 33/03* (2013.01);
(Continued)

(58) Field of Classification Search
CPC ...... E05F 15/73; E05F 15/40; B62D 33/0273; B62D 33/03; E05Y 2400/44;
(Continued)

(56) References Cited

U.S. PATENT DOCUMENTS

| | | |
|---|---|---|
| 2014/0156112 A1 | 6/2014 | Lee |
| 2018/0094471 A1 | 4/2018 | Mitchell |

FOREIGN PATENT DOCUMENTS

| | | |
|---|---|---|
| CN | 205010119 U | 2/2016 |
| CN | 107806306 A | 3/2018 |

(Continued)

OTHER PUBLICATIONS

English Translation of the Written Opinion of the International Search Authority for PCT/EP2019/065924, filed Dec. 28, 2020, retrieved from https://globaldossier.uspto.gov/#/details/EP/PCT%252FEP2019%252F065924/W/112460 (Year: 2020).*

(Continued)

*Primary Examiner* — Calvin Cheung
(74) *Attorney, Agent, or Firm* — Peter W. Schroen; Bret E. Field; Bozicevic, Field & Francis LLP

(57) ABSTRACT

The invention relates to a sensor device (10) for a vehicle (100), comprising a control unit (11) for actuating a movable part (101), in particular a tailgate, of the vehicle (100), and a sensor unit (12) for monitoring at least one first activation region (A1), wherein the control unit (11) is designed to actuate the movable part (101) of the vehicle (100) when at least one activation action (H1, H2, H3, B1, B2) of a user in the first activation region (A1) has been sensed by the sensor unit (12). The sensor unit (12) is designed to sense the at least one activation action (H1, H2, H3, B1, B2) of the user by means of electromagnetic waves in the radio frequency range.

20 Claims, 7 Drawing Sheets

Figure 1:
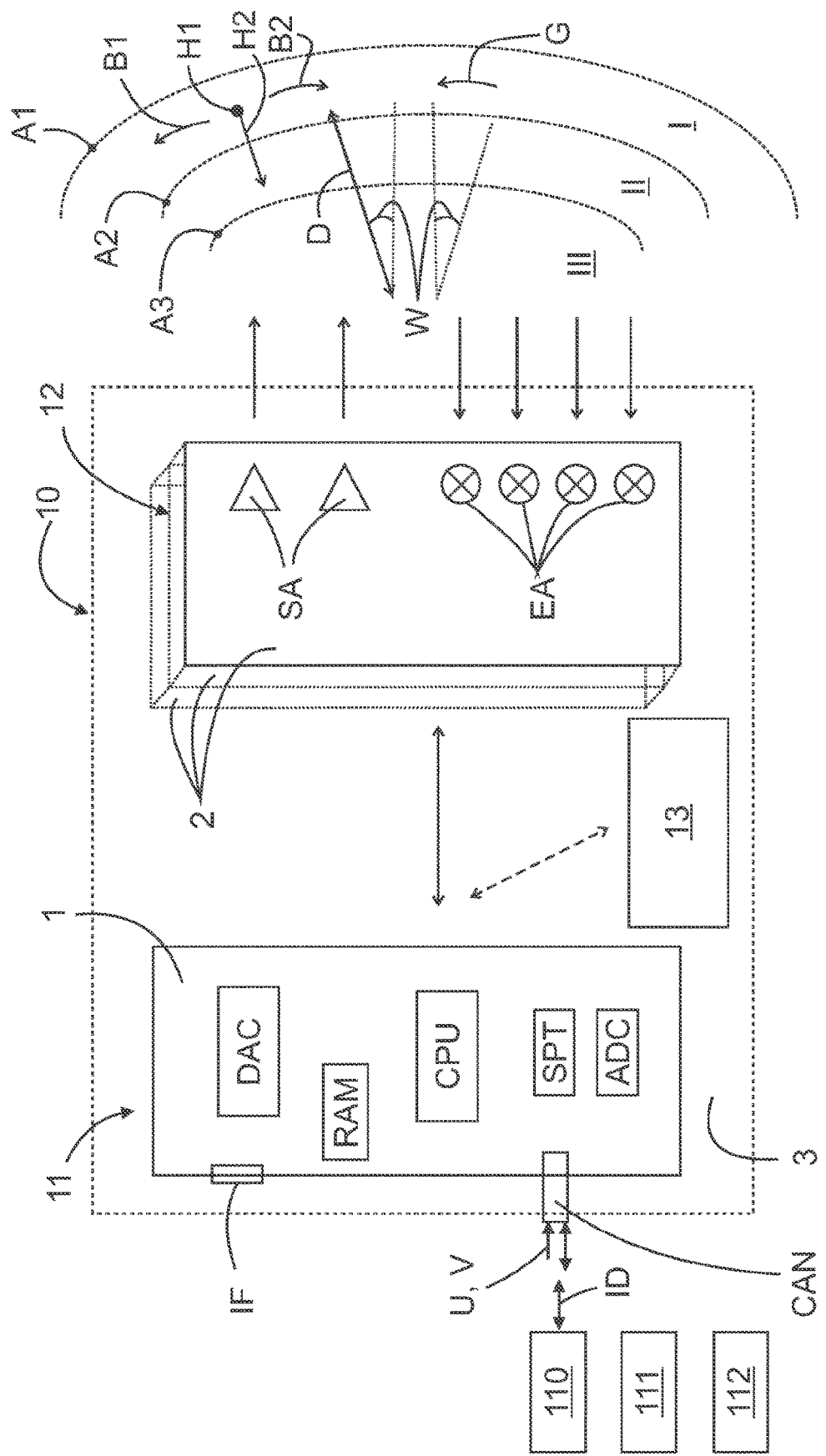

(52) U.S. Cl.
CPC ............ E05F 15/40 (2015.01); *E05Y 2400/44* (2013.01); *E05Y 2400/45* (2013.01); *E05Y 2400/54* (2013.01); *E05Y 2400/664* (2013.01); *E05Y 2400/858* (2013.01); *E05Y 2900/546* (2013.01)

(58) Field of Classification Search
CPC ............. E05Y 2400/45; E05Y 2400/54; E05Y 2400/664; E05Y 2400/858; E05Y 2900/546
See application file for complete search history.

(56) References Cited

FOREIGN PATENT DOCUMENTS

| DE | 102012107284 A1 * | 2/2014 | ............. E05F 15/77 |
|---|---|---|---|
| DE | 102012107284 A1 | 2/2014 | |
| DE | 102014101661 A1 | 8/2015 | |
| DE | 202015106608 U1 | 2/2016 | |
| DE | 102017215650 A1 | 3/2018 | |

OTHER PUBLICATIONS

First Office Action for Chinese Application No. 201980038801.8 dated Mar. 11, 2022, with its English translation, 23 pages.
Office Action for European Application No. 19732580.6 dated Jun. 14, 2023, with its English translation, 12 pages.
Second Office Action for Chinese Application No. 201980038801.8 dated Aug. 8, 2022, with its English translation, 19 pages.

* cited by examiner

SENSOR DEVICE FOR A VEHICLE

The invention relates to a sensor device for a vehicle according to the preamble of the independent device claim. Furthermore, the invention relates to an actuating device for a movable part, in particular a tailgate, of a vehicle according to the secondary independent device claim. Furthermore, the invention relates to a method for operating a sensor device according to the preamble of the independent method claim.

Known sensor devices for actuating a movable part, for example a tailgate, of a vehicle usually comprise sensors that can exchange information with the surroundings of the vehicle. Contactless capacitive sensors are often used as sensors. However, the operation of such sensors proves to be difficult because the capacitive field can easily be distorted by dirt. Furthermore, capacitive sensors require a relatively complex control. Furthermore, such sensor devices are usually limited in their function.

It is therefore an object of the present invention to at least partially overcome the disadvantages described above. On the one hand, it is an object of the present invention to provide a sensor device for a vehicle, which allows an improved and extended functionality as well as simple control. On the other hand, it is an object of the present invention to provide a corresponding actuating device for a movable part, in particular a tailgate, of a vehicle, which is equipped with the sensor device according to the invention. Furthermore, it is an object of the present invention to provide an improved method for operating such a sensor device.

The above object is solved by all features of the independent device claims, in particular from the characterizing part of the first independent device claim, and by all features of the independent method claim, in particular from the characterizing part. Further advantages and details of the invention result from the respective dependent claims, the description and the figures. Advantages and details which are described in connection with the inventive sensor device and the inventive actuating device are of course also valid in connection with the method according to the invention and vice versa, so that with regard to the disclosure of the individual aspects of the invention reference is or can always be made to each other.

The invention provides a sensor device for a vehicle, comprising a control unit for actuating a movable part, in particular a tailgate, of the vehicle, and a sensor unit for monitoring at least one first activation region of the movable part of the vehicle, wherein the control unit is designed to actuate the movable part of the vehicle when at least one activation action of a user in the first activation region has been sensed by the sensor unit. According to the invention, the sensor unit is designed to sense the at least one activation action of the user by means of electromagnetic waves in the radio frequency range (radar waves). The sensor device can be designed in the form of a modular unit that can be handled individually, for example in the form of a chip, preferably a radar chip, which can be fixed to the motor vehicle, in particular as a coherent structural unit.

In the case of a sensor device for actuating a movable part in the form of a tailgate of the vehicle, the sensor device may advantageously be arranged directly in the tailgate or in an actuating device for the tailgates or in the region of an emblem, or can be protected from the outside and/or invisibly installed there. However, it is also conceivable that such a sensor device could be installed at a distance from the tailgate in the region of a license plate, a bumper or a diffuser of the vehicle. The sensor unit can also be arranged there in a covered way.

In order to actuate the movable part of the vehicle, the sensor device in the sense of the invention may be in communication connection with a closing device and/or a drive device of the tailgate of the vehicle in order to control the movable part, i.e. the tailgate, accordingly. In the case of a tailgate as the movable part of the vehicle in the sense of the invention, it is conceivable that the control unit of the sensor device can send different control signals for locking, unlocking, opening and/or closing the tailgate to the closing device and/or the drive device of the tailgate depending on the sensed activation action.

The sensor device in the sense of the invention may further be in communication connection with a security device of the vehicle to verify a user's authorization to actuate movable parts of the vehicle. Nevertheless, it is also conceivable that the sensor device itself can carry out a security query. The communication connection with the security device can be a wireless connection, for example using radio waves, or a connection via a bus, which can be executed using the control unit of the sensor device. Thus, the sensor device can form part of a keyless-go system or keyless-entry system of the vehicle. Further, in the sense of the invention, it is conceivable that the sensor device can form a single coherent modular unit, which can even be handled with one hand for an easy assembly on the vehicle.

The invention recognizes that the sensor units, which use radar waves to exchange information with the vehicle's surroundings, are increasingly used in various assistance systems in vehicles. Therefore, vehicles are usually equipped with suitable electronics and corresponding control software.

The idea of the invention is that for actuating the movable part, in particular a tailgate (locking, unlocking, opening and/or closing) of the vehicle, a sensor device is provided which senses corresponding activation actions of a user in the first activation region by means of electromagnetic waves in the radio frequency range or radar waves. For a given process to actuate the movable part, a corresponding activation action may be provided. Radar waves can be used to provide not only a precise distance measurement, but also a velocity and/or angle measurement. Therefore, radar waves can be used to recognize different, even complicated, gestures and 2D and/or 3D movement patterns. With radar waves, the activation region, comprising the bandwidth and range of the sensor unit, can be easily adjusted, for example, by using a corresponding transmission frequency and/or transmission pulse period, for example that changes in an interval. This makes such a sensor device advantageously suited to recognize different activation actions. Such a sensor device is also relatively resistant to environmental influences. For these reasons, such a sensor device using radar waves is suitable for actuating the movable part of the vehicle, such as a tailgate.

It is conceivable that the sensor device in the context of the invention may use its own sensor unit to sense the at least one activation action of the user by means of radar waves. Nevertheless, it is also conceivable that the sensor device could use the existing sensor technology of the vehicle, for example an assistance system of the vehicle, to monitor a first activation region for at least one activation action of the user using electromagnetic waves in the radio frequency range. An assistance system for automated or autonomous driving, parking and/or reversing is conceivable as a corresponding assistance system of the vehicle. In principle, different assistance systems of the vehicle are compatible with the sensor device according to the invention, which comprise an activation region or sensing region in the rear region of the vehicle.

In addition, it is conceivable that the sensor device with the sensor unit according to the invention can provide a corresponding sensor technology for at least one assistance system of the vehicle.

Since the movable part of the vehicle is usually actuated when the vehicle is stationary and the assistance systems of the vehicle are usually activated when the vehicle is moving, it may be advantageous to use the sensor device either to actuate the movable part of the vehicle or to drive the vehicle in an assisted and/or autonomous manner, depending on the velocity of the vehicle.

Thus, several essential advantages can be achieved due to the invention. The activation of the movable part of the vehicle can be carried out safely, reliably and comfortably. A simple assembly and control of the sensor device can be guaranteed. The resources within the sensor device and the vehicle can be used in a beneficial way and a sensor device with an extended functionality can be provided.

Furthermore, in the case of a sensor device, the invention may provide that the control unit is designed to control at least one assistance system of the vehicle or at least can contribute to it. Thus, the control unit can be provided with an extended functionality. The control unit can provide the sensor unit in at least one operating mode of the sensor device for the needs of the assistance system in order to sense information such as the distance, velocity and/or angular orientation to other standing and/or driving road users.

Furthermore, it is conceivable that the control unit can be brought into a communication connection with a vehicle-side control device of an assistance system of the vehicle. Thus, the control unit can transmit the information of the sensor unit (sensor data) to the vehicle-side control device, for example by means of radio waves or via a bus. This information can be used within the assistance system without having to provide a separate sensor technology for the assistance system, or at least to support this sensor technology.

The following assistance systems are conceivable as assistance systems in the sense of the invention, which are controlled and/or supplied with sensor data by means of the control unit: Assistance systems for automated or autonomous driving, parking and/or reversing. Such assistance systems usually comprise activation regions or monitoring regions that extend in the back region of the vehicle (rear region). Thus, the sensor device for actuating the movable part, which is arranged in the rear region of the vehicle, such as the tailgate, can provide such a monitoring region behind the vehicle by means of its own sensor unit.

Furthermore, it is conceivable that the control unit can receive the sensor data of an assistance system of the vehicle via the communication connection with the vehicle-side control device in order to use this data.

Furthermore, the invention may provide in a sensor device that the sensor unit is designed for a distance measurement, a velocity measurement and/or an angle measurement within the first activation region and/or a second activation region and/or a third activation region. In this way, the sensor unit can be used to sense information that can be used to control at least one assistance system of the vehicle.

In addition, the invention may provide that the sensor device comprises at least one first operating mode, a second operating mode and/or a third operating mode. Advantageously, the first operating mode can be used for actuating the movable part of the vehicle, for example for controlling a closing device and/or a drive device of a tailgate of the vehicle. A prerequisite for the first operating mode may advantageously be that the vehicle is stationary or moving at a low velocity below 3 km/h. Thus, the security can be provided that the tailgate of the vehicle is not opened unintentionally when the vehicle is moving.

The second operating mode of the sensor device can be activated advantageously when the vehicle is moving at a velocity between 3 km/h and 30 km/h, in particular between 3 km/h and 20 km/h, preferably between 3 km/h and 10 km/h. This is the velocity range in which certain assistance systems can be advantageous, such as: a parking aid or similar. The second operating mode of the sensor device in the context of the invention may thus be dedicated to these assistance systems.

The third operating mode of the sensor device can be activated advantageously when the vehicle is moving at a velocity starting from 10 km/h, in particular from 20 km/h, preferably from 30 km/h. This is the velocity range in which certain assistance systems can also be of importance, such as: an assistance system for reversing or similar. The third operating mode of the sensor device can thus be assigned to these assistance systems within the scope of the invention.

Furthermore, the invention may provide that certain assistance systems may use the sensor device according to the invention in the second operating mode and other assistance systems may use the sensor device in the third operating mode.

Further, in the case of a sensor device, the invention may provide that in at least one operating mode the sensor device is operable to sense the at least one activation action of the user in the first activation region. Thus, the sensor device can be used to actuate the movable part of the vehicle. The radar-based sensor unit allows to sense, determine and differentiate between different activation actions in the form of gestures or movement patterns, leg and/or foot movements, approach attempts or simple presences in the first activation region. Thus, increased comfort can be provided when actuating the movable part. In the case of a tailgate as the movable part of the vehicle in the sense of the invention, it may be advantageous for the sensor device to be able to initially detect a presence of a user. Afterwards a security query can be executed or initiated. For unlocking and/or opening the tailgate, different movement patterns, for example stroke movements with one hand along the tailgate in different directions, or different leg and/or foot movements, for example kicking movements and/or rocking movements underneath the rear space with one foot, can be provided. To close and/or lock the tailgate, another movement pattern can be provided, for example a typing movement from above towards an outer skin of the tailgate.

Furthermore, the invention can provide in a sensor device that in at least one operating mode the sensor device is operable for a distance measurement, a velocity measurement and/or an angle measurement within the first activation region and/or a second activation region and/or a third activation region. Thus, different information can be sensed, which can be of advantage for the operation of an assistance system of the vehicle.

Furthermore, in the case of a sensor device, the invention may provide that in at least one operating mode the sensor device is operable to sense an obstacle when the movable part of the vehicle is actuated. Thus, a particularly safe and accident-free actuation of the movable part can be guaranteed in order not to damage the movable part and surrounding objects or to endanger persons.

In addition, the invention may provide that in at least one operating mode, for example in the first operating mode, of the sensor device, the sensor unit is assigned a transmission frequency in the frequency range between 76 GHz and 77 GHz. In this way, the sensor unit can monitor the surroundings of the vehicle by means of long-range radar waves (Long Range Radar or LRR) with a relatively narrow bandwidth. This can be advantageous for assistance systems with an initial range of up to 250 m. However, a high range can also be advantageous for sensing a user approaching the vehicle, to ensure that there is no delay when the movable part is actuated. It is also conceivable that the sensor unit can be operated in at least one operating mode, for example in the first operating mode, as a pulse radar or as a continuous wave radar (CW radar), for example as a modulated continuous wave radar (FMCW radar).

Furthermore, the invention may provide in a sensor device that in at least one operating mode, for example in the second operating mode, of the sensor device the sensor unit is assigned a transmission frequency in the frequency range between 77 GHz and 81 GHz. At these frequencies a relatively small transmitting antenna can be used. The relatively wide bandwidth ensures a high resolution. This allows the sensor unit to monitor the vehicle's surroundings using Short Range Radar (SRR) waves. This can be advantageous for assistance systems with a second range of up to 70 m. However, such a range can also be advantageous for recognizing a user approaching the vehicle, on the one hand to limit the monitoring region and on the other hand to allow a quick sequence of operations when actuating the movable part. Such transmission frequencies are also less susceptible to reflections when passing through layers with a certain material thickness. It is also conceivable that the sensor unit can be operated in at least one operating mode, for example in the second operating mode, as a continuous wave radar, in particular as a modulated continuous wave radar (FMCW radar).

Furthermore, the invention may provide in the case of a sensor device that in at least one operating mode, for example in the third operating mode, of the sensor device the sensor unit is assigned a transmission frequency in the frequency range between 77 GHz and 81 GHz. At these frequencies a relatively small transmitting antenna can be used. The relatively wide bandwidth ensures a high resolution. This bandwidth allows the sensor unit to monitor the vehicle's surroundings using Ultra Short Range Radar (USRR) waves. This can be advantageous for assistance systems with a third range of up to 30 m. But also for recognizing a user approaching the vehicle, such a range can be advantageous to provide a limited monitoring region and still allow a sufficiently fast sequence of actuation of the movable part. Such transmission frequencies comprise wavelengths that can pass through layers of certain material thicknesses with relatively little interference. In addition, the influence of paint layers at such wavelengths is relatively low, so that the sensor device can be adapted to the appearance of the vehicle in an advantageous way with a high degree of design freedom. It is also conceivable that the sensor unit can be operated in at least one operating mode, for example in the third operating mode, as a continuous wave radar, in particular as a modulated continuous wave radar (FMCW radar).

Furthermore, the invention may provide for a sensor device that in at least one operating mode of the sensor device a first bandwidth or a second bandwidth is/are assigned to the sensor unit. The bandwidth can easily determine the width of the respective activation region. The respective activation region or the respective monitoring region can be designed in the form of a sensing lobe. Different bandwidths can be advantageous for different functions. For example, a narrow activation region is advantageous for a distance control for reverse parking. For another assistance system or for actuating the movable part, a wide activation region can be advantageous in order to allow the activation region around the vehicle to be monitored as closely as possible.

Further, in a sensor device, the invention can further provide that the sensor unit is designed to sense a presence and/or an approach and/or a leg and/or foot movement of the user as the at least one activation action in the first activation region, and/or that the sensor unit is designed to sense at least one first movement pattern or one second movement pattern by a hand of the user as the at least one activation action in the first activation region. Thus, the sensor unit can be used in combination with different technologies to actuate the movable part, in particular the tailgate, of the vehicle.

In addition, the invention may provide for a sensor device that the control unit is designed for a security query or for the query of an access authorization of the user, or that the control unit can be brought into a communication connection with a security device of the vehicle in order to verify an access authorization of the user. Thus, the sensor device can form part of a keyless-go system or a keyless-entry system.

Furthermore, in the context of the invention, it is conceivable in a sensor device that the control unit is designed to actuate (unlock and/or open) the movable part when, by means of the sensor unit, a leg and/or foot movement of the user has been sensed as the at least one activation action in the first activation region. In this way a comfortable actuation of the movable part can be enabled. In particular in case of a tailgate as the movable part of the vehicle, this can be an advantage if the user carries objects in his hands and does not have a free hand available. Nevertheless, a certain leg and/or foot movement of the user can be used to ensure that the tailgate is not accidentally operated, e.g. by a passing cat or other random movement in the rear of the vehicle.

Furthermore, the invention may provide that the control unit is designed to sense the leg and/or foot movement of the user in the form of a movement with one leg of the user towards the movable part and a kicking movement with one foot under the movable part, and/or the control unit is designed to sense the leg and/or foot movement of the user in the form of a rocking movement with one foot under the movable part. Thus, a certain sequence for the leg and/or foot movement of the user can be determined. In this way, the risk of incorrect actuation of the movable part can be considerably reduced.

Further, the invention may provide that the control unit is designed to actuate the movable part when a first movement pattern and a second movement pattern have been successively sensed as the at least one activation action in the first activation region. This allows the movable part to be actuated with one hand, which can perform movement patterns defined by gestures, in order to reduce the risk of incorrect actuation of the movable part.

Furthermore, the invention may provide that the control unit is designed to sense the first movement pattern in the form of a stroke movement with one hand in a first direction along the movable part and the second movement pattern in the form of a stroke movement with one hand in a second direction along the movable part. This enables a comfortable and safe actuation of the movable part. It is also conceivable that the first direction and the second direction can be essentially horizontal and/or opposite. Thus, the first movement pattern and the second movement pattern can enable a simple and intuitive actuation of the movable part.

In addition, in the context of the invention, in the case of a sensing device, it is possible that the control unit is designed to stop actuation of the movable part if an obstacle has been sensed which blocks the actuation of the movable part. Thus, the movable part can be operated safely and the risk of damage to surrounding objects or injury to living objects in the surroundings of the movable part of the vehicle can be reduced. In other words, it ensures that the movable part is only actuated when there is sufficient space for its movement.

Furthermore, the invention may provide at least one further sensor unit in a sensor device to sense the at least one activation action of the user by means of electromagnetic waves in the optical frequency range or in the infrared range or by means of capacitive measurement. Thus, a combination sensor technology can be provided within the sensor device, which can take advantage of several technologies for certain activation actions in a beneficial manner. In this way, the sensor device within the scope of the invention is widely applicable and can be combined with different technologies. It is conceivable, for example, that a push button and/or a capacitive sensor can be provided to close and/or lock the tailgate. A further sensor unit with an optical sensing can also be used to recognize certain activation actions of the user.

According to another advantage of the invention, the sensor device can be arranged on the movable part, on an emblem, on a license plate, on a bumper or on a diffuser of the vehicle. The sensor device can thus be used in the back region of the vehicle. In this way, the sensor device can be integrated into existing assistance systems of the vehicle or form further assistance systems that comprise monitoring regions in the rear region of the vehicle.

Furthermore, the invention may advantageously provide that the sensor device with the control unit, the sensor unit, and possibly a further sensor unit, is designed in the form of a modular assembly. Thus, an easy handling and a comfortable assembly of the sensor device can be provided.

Furthermore, the invention may provide that the sensor device comprises a carrier plate for the control unit, the sensor unit, and possibly another sensor unit. Thus an easy assembly of the sensor device can be provided.

In addition, in the context of the invention it may be provided in a sensor device that the sensor unit comprises at least one transceiver, wherein in particular the transceiver comprises at least one, preferably two, transmitting antennas and at least one, preferably four, receiving antennas. Thus, an active monitoring, for example in the form of a scanning, of the surroundings of the vehicle can enabled. The transceiver can use transmitting antennas to transmit radar waves that can be reflected by objects or persons. The reflected radar waves are received by the receiving antennas and provide information about the sensed objects or persons as well as their positions, movements or similar. With the help of the transceiver the surroundings of the vehicle can be analyzed. With the help of two transmitting antennas and four receiving antennas, a detailed image of the vehicle's surroundings and the events around the vehicle can be sensed, comprising defined movement patterns. One of the transmitting antennas can transmit a defined pattern signal which is compared with the reflected received signal.

The invention may advantageously provide that the transmitted signal is provided with a vehicle identification to distinguish the own transmitted signal from external signals. A modulation of the transmitted signal is possible as the vehicle identification. The transmitted signal can serve as a carrier on which a useful signal is modulated. As parameters for the modulation, the amplitude or the phase of the transmitted signal can be used. The modulation can be continuous or discrete in time. In principle, it is conceivable that the ID code of the authorized user is used as the useful signal for the modulation. Furthermore, it is conceivable that the receiving antennas can receive the ID code as a modulated useful signal. The control unit can then evaluate the ID code. In this way, the security query can be carried out with the help of the sensor device within the scope of the invention. According to another advantage of the invention, the transmitting device can be switched off after actuating the movable part.

Furthermore, in the case of a sensor device, the invention may provide that the control unit comprises at least one microcontroller, wherein in particular the microcontroller comprises at least one converter, at least one signal processing unit, at least one processor unit, at least one memory unit, at least one interface and/or at least one terminal for communication and/or energy supply. Thus, an autonomous processor with comprehensive peripheral functions can be provided within the scope of the sensor device. The microcontroller can process and analyze the information of the sensor unit to ensure different operating modes of the sensor device.

Furthermore, the invention may provide that a housing for the sensor device is provided to receive the sensor device protected from environmental and/or weather influences. The housing can be used to provide a self-contained unit that can be handled as a module or modular assembly.

It is also conceivable that the housing can completely enclose the sensor device. Thus, the sensor device can be particularly protected and safely received.

Furthermore, the invention may provide for the sensor device that the housing for the sensor device comprises a cover element, which is advantageously openable, through which the sensor device can be inserted within the housing. Thus, an easy assembly of the sensor device can be guaranteed. The cover element also ensures that the sensor device can be made accessible for repair. For this purpose, the cover element can be designed to be removable and/or openable. An engaging connection and/or a hinged connection and/or a labyrinth guide between the cover element and the housing can be provided for attaching and preferably fixing the cover element to the housing.

Furthermore, it is possible within the scope of the invention that an opening in an outer skin of the movable part, of a license plate, of a bumper or of a diffuser of the vehicle can be closed by the cover element, and/or the cover element for the housing can be designed in the form of an emblem of the vehicle. Nevertheless, it is also conceivable within the scope of the invention that a portion of an outer skin of the movable part, of a license plate, of a bumper or of a diffuser of the vehicle may serve as a cover element. Thus, the sensor device can be protected and inconspicuously arranged in an advantageous way and optimally adapted to the appearance of the vehicle. It is conceivable that a corresponding engaging connection and/or a hinged connection and/or a labyrinth guide may be provided between an inner side of the outer skin of the respective component or an edge of the opening and the housing of the sensor device.

In addition, the housing for the sensor device and/or the cover element can be formed from a radar-transparent material, in particular plastic, preferably polymer. This ensures that the propagation of electromagnetic waves in the radiofrequency range is undisturbed and that the sensor device can be arranged protected from weather influences at the same time.

Furthermore, the invention may provide that the housing for the sensor device and/or the cover element is/are provided at least partially with a coating, preferably with a material thickness of 10 nm to 100 nm. By means of the coating, the outer appearance of the sensor device can be designed. It is conceivable that the coating can represent decorative strips and/or a design surface and/or a display and/or an emblem and/or a brand name.

It is also conceivable that the coating could be designed in the form of a lacquer coat, a spray layer, or a layer deposited by means of gas phase deposition or by means of sputtering, for example. In this way, the freedom of design in the embodiment of the coating can be extended in an advantageous way.

It is also conceivable that the coating may comprise metal particles, preferably chromium, and/or a semiconductor material, preferably silicon. Thus, a metallic appearance of the coating can be achieved.

Furthermore, it may be provided in the context of the invention in the case of a sensor device that the housing for the sensor device comprises at least one or more assembling means for receiving the sensor device within the housing in a form- and/or force-locking manner. Thus, the assembly of the sensor device as well as the exchange of individual components, e.g. for maintenance and/or upgrading of the sensor device, can be facilitated in a beneficial manner.

Furthermore, it is possible within the scope of the invention that the assembling means are designed to clamp the carrier plate of the sensor device inside the housing and/or the assembling means comprise a circumferential groove for the carrier plate of the sensor device, into which the carrier plate can be inserted. Thus, the assembly of the sensor device can be simplified even further.

Furthermore, it may be provided in the context of the invention in the case of a sensor device that the housing for the sensor device comprises at least one or more fixing means for fixing the sensor device in a form- and/or force-locking manner to a vehicle-side opening and/or to a vehicle-side carrier element. The outer skin of the movable part, an emblem, a license plate, a bumper or a diffuser of the vehicle can also serve as a carrier element. This enables a simple and convenient assembly of the sensor device on the vehicle.

Furthermore, it is conceivable that the fixing means may comprise engaging means which can be brought into mechanical operative connection with corresponding counter-engaging means on a vehicle-side opening and/or on a vehicle-side carrier element, and/or the fixing means comprise a guiding rail in order to simply push in the sensor device at a vehicle-side opening and/or at a vehicle-side carrier element. This can further facilitate the assembly of the sensor device on the vehicle.

Furthermore, the object according to the invention is solved by an actuating device for a movable part, in particular a tailgate, of a vehicle, which comprises a sensor device that can be designed as described above. By means of the actuating device according to the invention, the same advantages are achieved as described above in connection with the sensor device within the scope of the invention. These advantages are fully referred to in the present case.

Furthermore, it is advantageous that a sensitive gesture and/or movement pattern recognition can be provided by means of radar waves. In this way, movement patterns with the hand and/or combined leg and/or foot movements can be recognized with the sensor device. This can enable safe and comfortable actuation of the movable part.

Furthermore, it may be provided within the scope of the invention in the case of an actuating device that a sensor device for monitoring at least one first activation region and a further sensor device for monitoring a further switching region of the movable part of the vehicle are provided. Thus, the functionality of the actuating device can be further improved. With the aid of several sensor devices, it is also possible to provide different, preferably separable, monitoring regions (activation region and switching region), which can increase the security when actuating the movable part. Several sensor devices can also be used to verify complex movement patterns and movements that can advantageously enhance the functionality of the sensor device.

It is also conceivable that the first activation region comprises an essentially horizontal extension and that the switching region comprises an essentially vertical extension. By sensing an activation action first in the horizontal activation region and then a further activation action in the vertical region, it is possible to reliably distinguish between a leg movement towards the movable part and a kicking movement with the foot under the movable part. Thus, a random approach to the movable part can be reliably distinguished from a conscious activation action of a user. The danger of a false activation of the movable part is thus considerably reduced.

In addition, the object according to the invention is solved by a method for operating a sensor device for a vehicle, wherein the sensor device can be designed as described above. Within the scope of the method according to the invention, it is provided that the sensor device is operated in at least one operating mode for sensing at least one activation action of a user in the first activation region in order to actuate a movable part, in particular a tailgate, of the vehicle, and that the sensor device is operated in at least one operating mode for a distance measurement, a velocity measurement and/or an angle measurement within the first activation region and/or a second activation region and/or a third activation region in order to control at least one assistance system of the vehicle. By means of the method according to the invention, the same advantages are achieved as described above in connection with the sensor device and/or actuating device within the scope of the invention. Full reference is made to these advantages.

Advantageously, the sensor device can use electromagnetic waves in the radio frequency range (radar waves) to sense the at least one activation action of a user in the first activation region and for a distance measurement, a velocity measurement and/or an angle measurement within the first activation region and/or a second activation region and/or a third activation region. With the help of radar waves, different functions and operating modes of the sensor device can be realized in an advantageous way.

Figure 2:
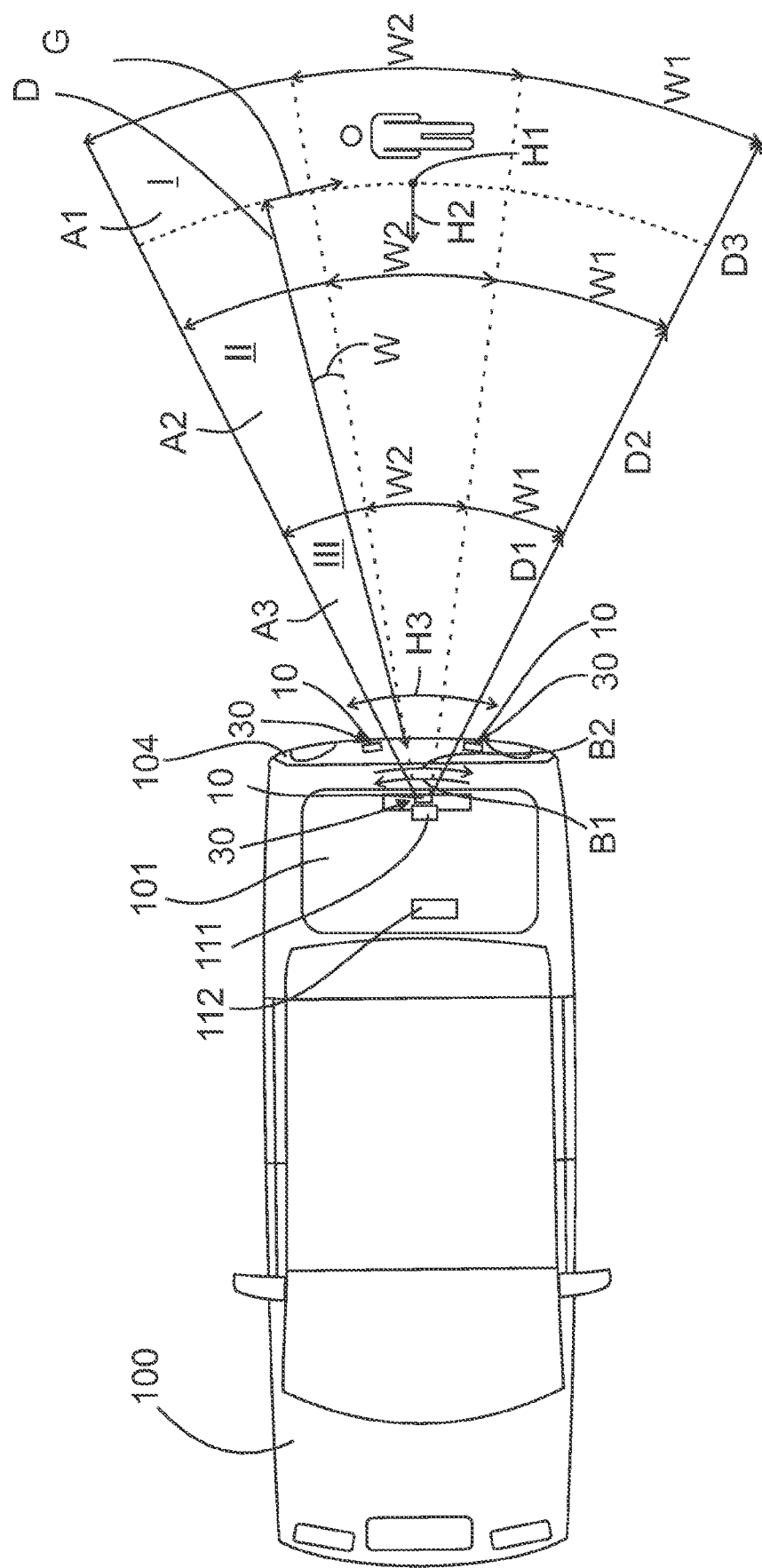
Figure 3:
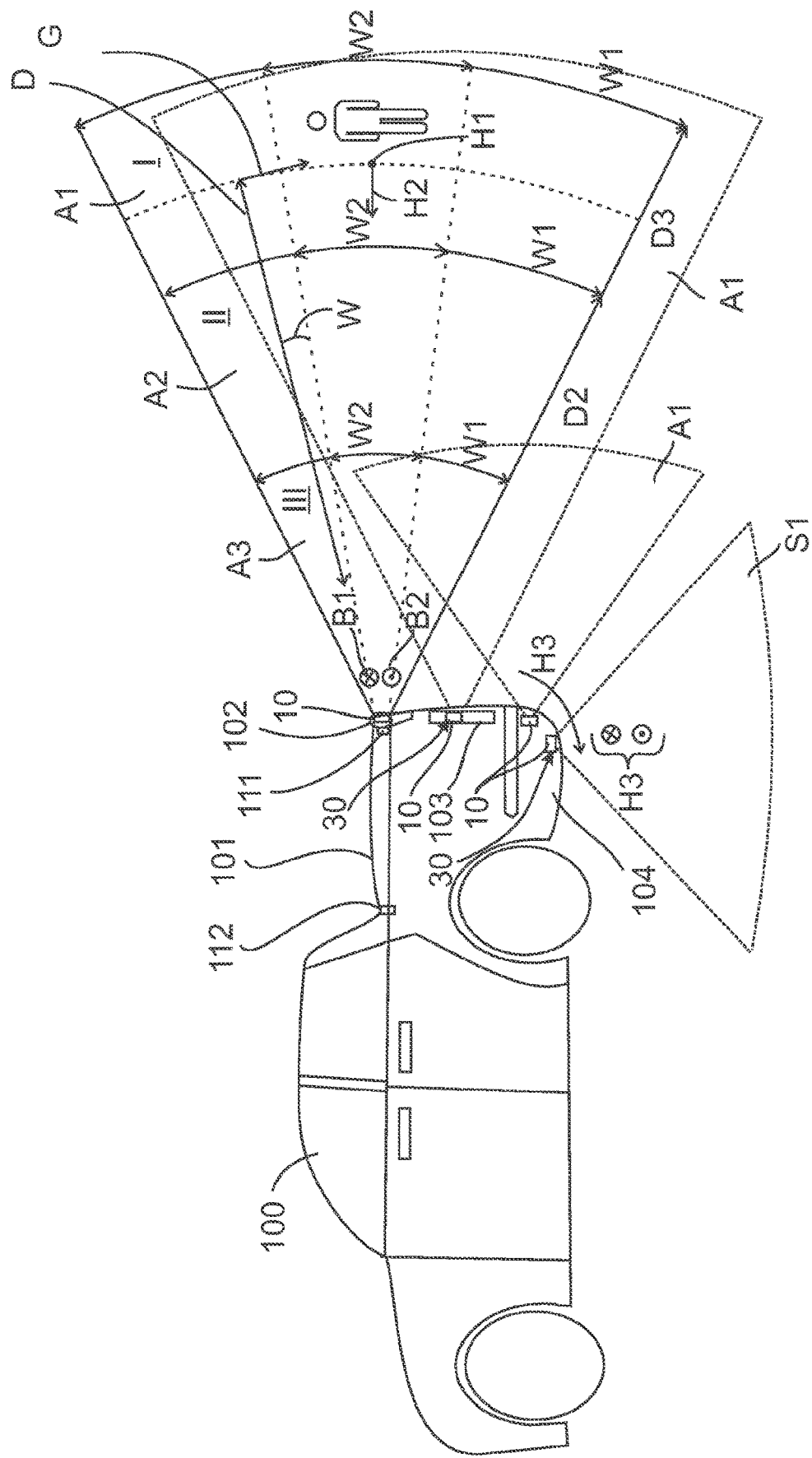
Figure 4:
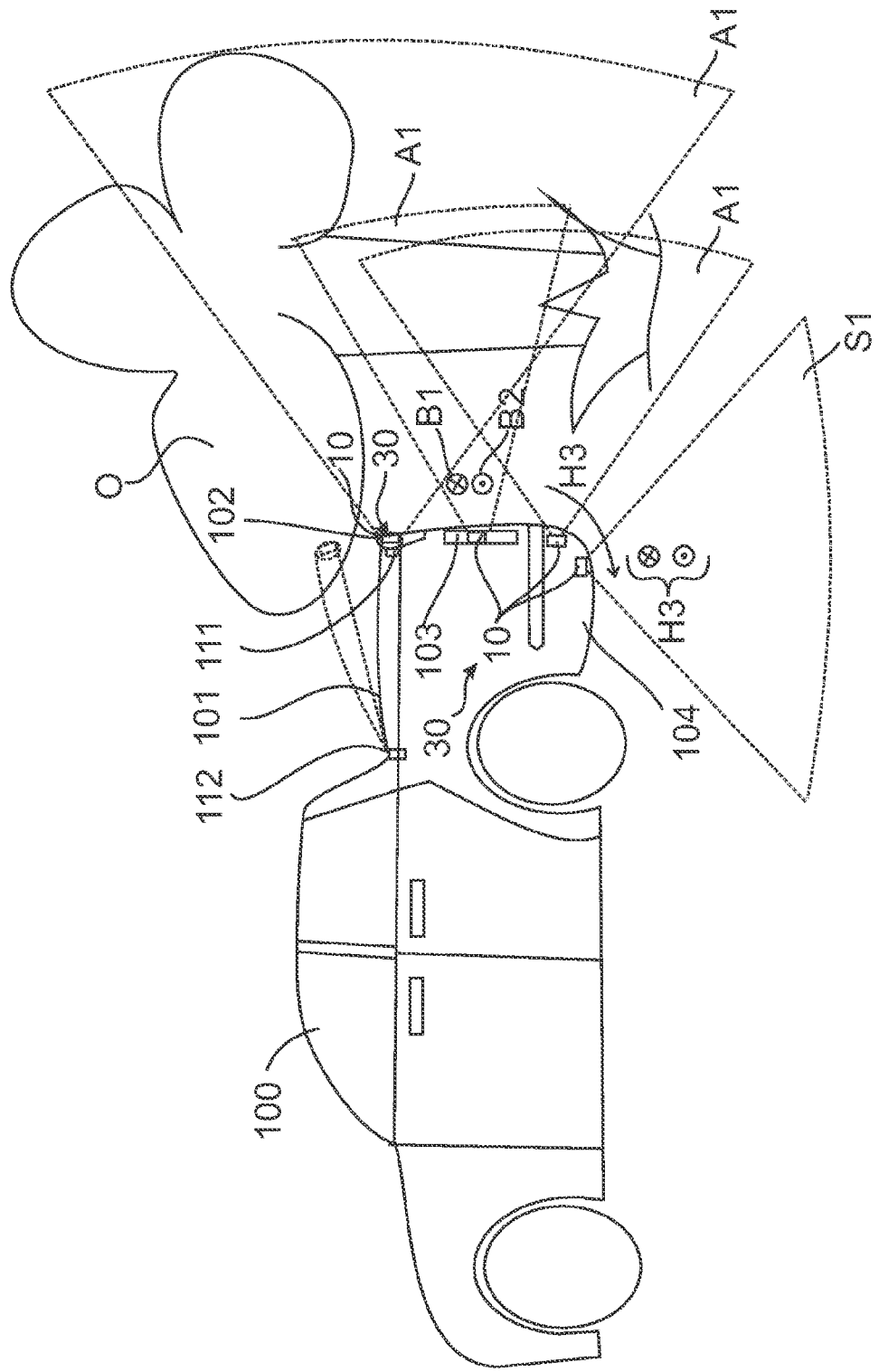
Figure 5:
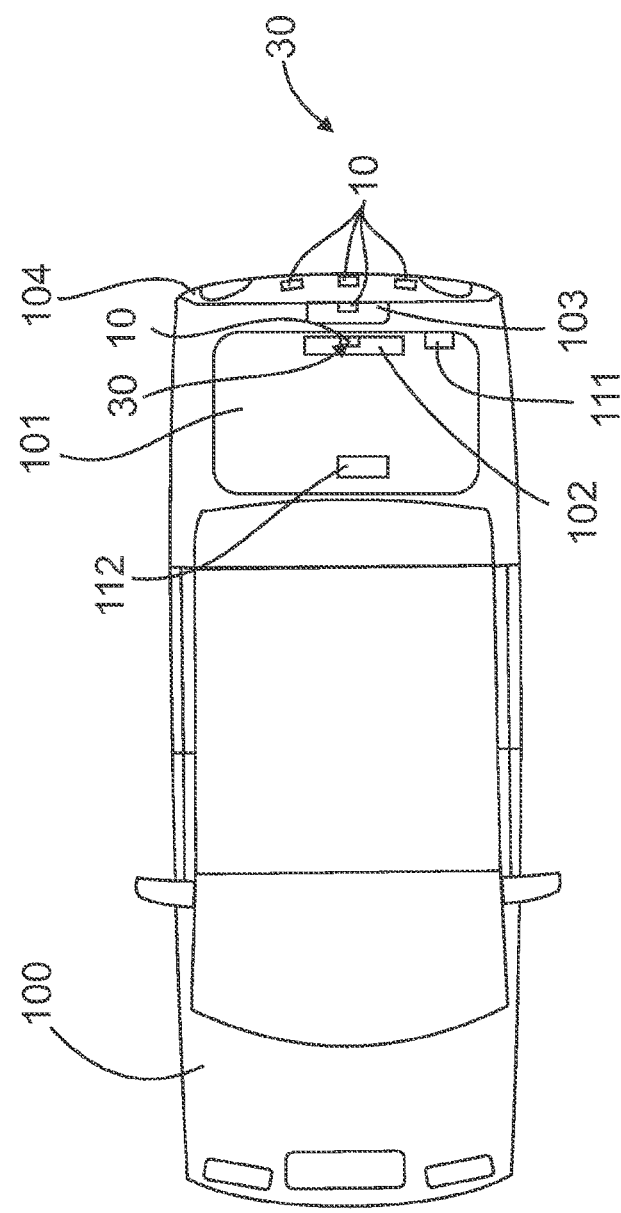
Figure 6:
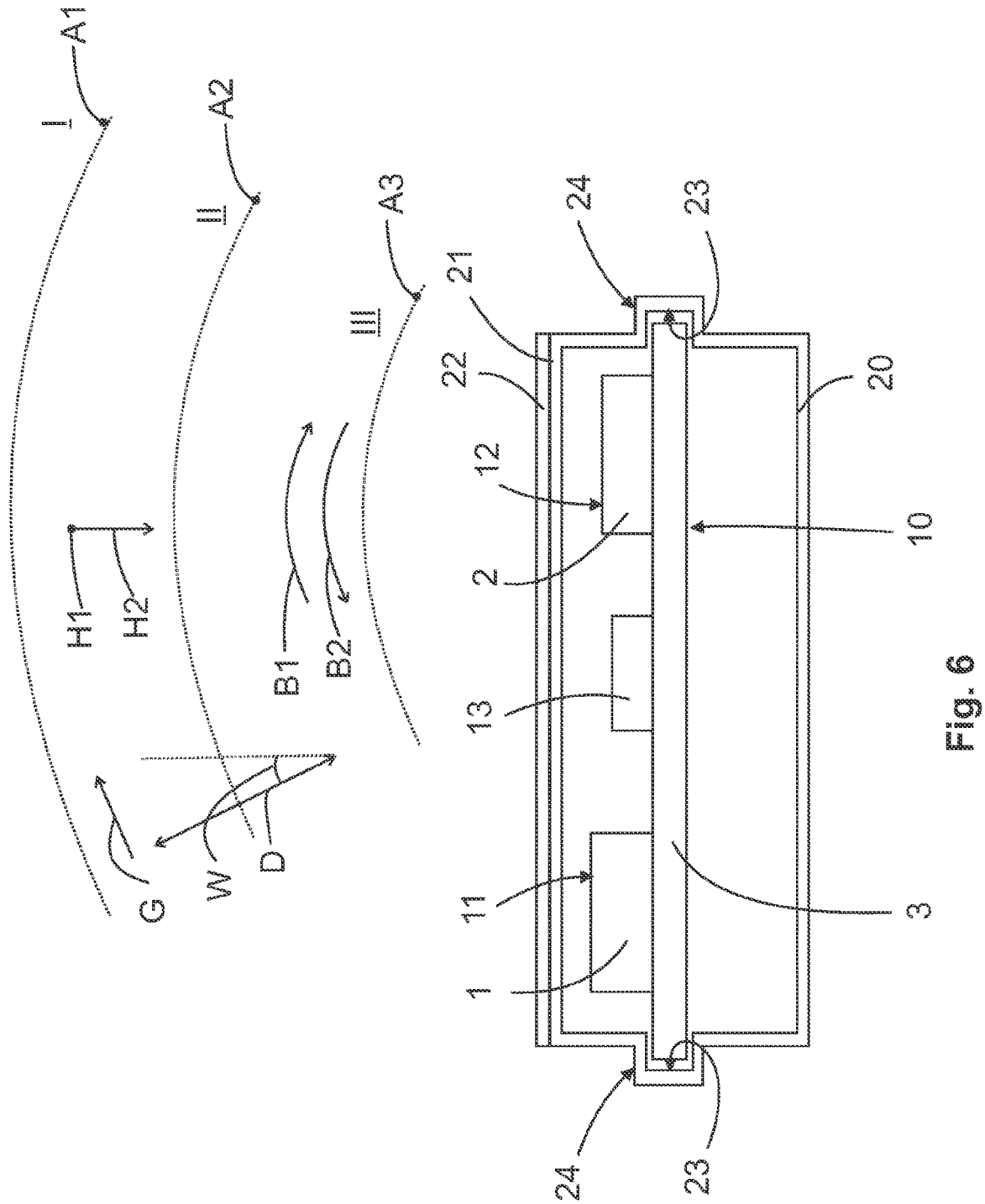
Figure 7:
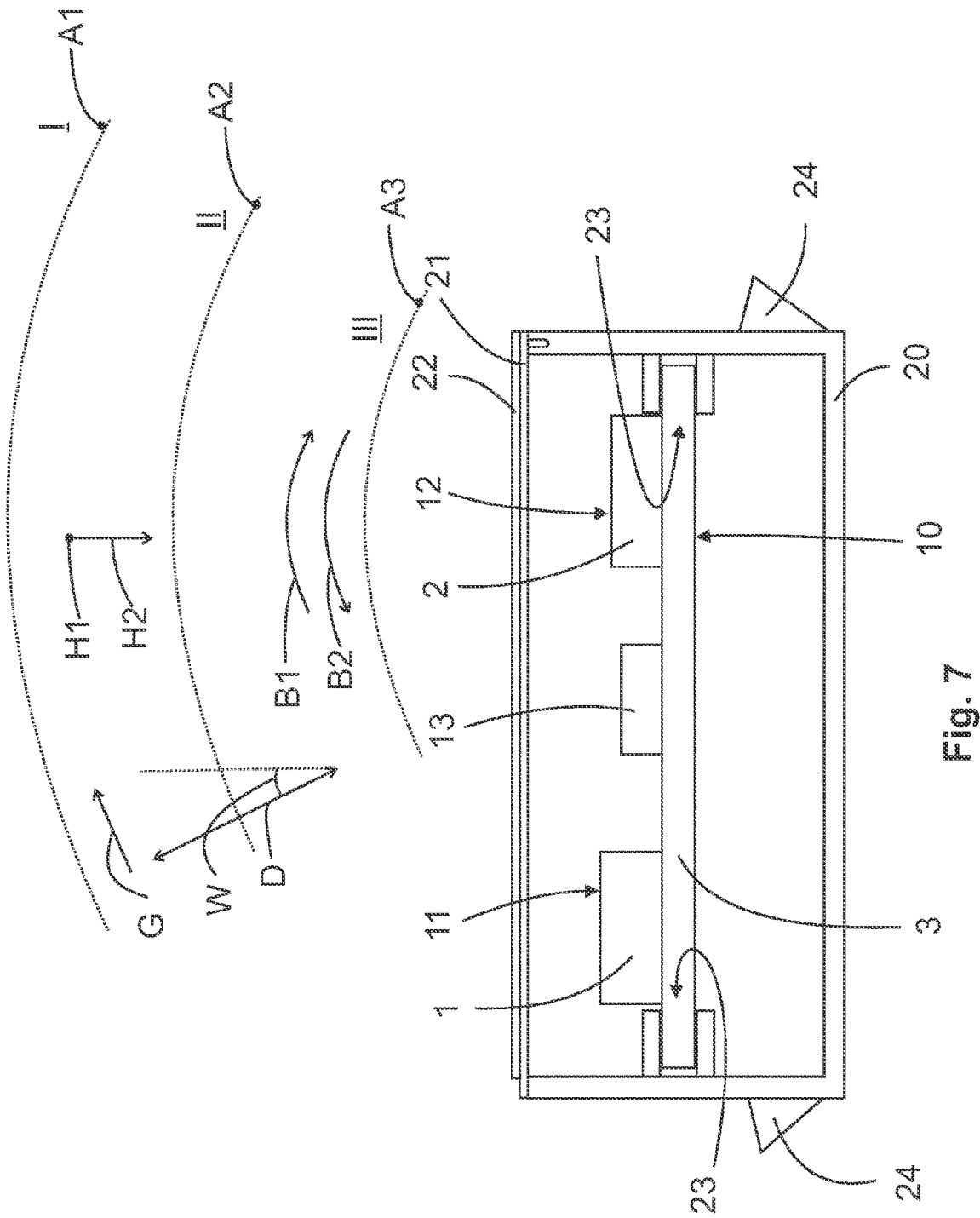

Further advantages, features and details of the invention result from the following description in which, with reference to the figures, embodiments of the invention are described in detail. The features mentioned in the claims and in the description may be individually or in any combination essential to the invention. The figures show:

FIG. 1 a schematic representation of a sensor device in the sense of the invention, FIG. 2 a schematic representation of a vehicle with a sensor device in the sense of the invention as seen from above, FIG. 3 a schematic representation of a vehicle with a sensor device in the sense of the invention in a side view, FIG. 4 a schematic representation of a sensor device in a possible operating mode with an obstacle recognition, FIG. 5 a schematic representation of a sensor device at different possible installation locations on a vehicle, FIG. 6 a schematic structure of a sensor device in the sense of the invention in a sectional view through the sensor device, and FIG. 7 a further possible structure of a sensor device in the sense of the invention in a sectional view through the sensor device.

In the following figures, the identical reference signs are used for the same technical features even from different embodiments.

FIG. 1 shows a sensor device 10 in the sense of the invention, which can be used in several locations in a vehicle 100, as shown in FIG. 5 below. The sensor device 10 comprises a control unit 11, which is used to actuate, e.g. lock, unlock, open or close a movable part 101, e.g. a tailgate 101, of the vehicle 100. For this purpose, the control unit 11 can contact a closing device 111 or a drive device 112 of the movable part 101, in particular the tailgate 101, of the vehicle 100 and transmit a corresponding control signal for a corresponding actuation (unlocking, locking, opening, closing) of the movable part 101. Furthermore, the sensor device 10 comprises a sensor unit 12 for monitoring at least one first activation region A1 of the movable part 101 of the vehicle 100. Within the scope of the invention, the control unit 12 is designed to actuate the movable part 101 of the vehicle 100 if at least one activation action H1, H2, H3, B1, B2 of a user in the first activation region A1 has been sensed by the sensor unit 12. In accordance with the invention, the sensor unit 12 is designed to sense the at least one activation action H1, H2, H3, B1, B2 of the user by means of electromagnetic waves in the radio frequency range (radar waves).

As can be seen from FIGS. 2 to 5, the sensor device according to the invention may preferably be designed to actuate a tailgate 101 of the vehicle 100. The sensor device 10 can be arranged directly at the movable part 101, i.e. at the tailgate 101. The sensor device 10 can be arranged at an opening in an outer skin of the tailgate 101 and/or on a carrier element and/or behind the outer skin of the tailgate 101. Since the radio waves can pass most plastics without interference, it is conceivable that the outer skin of the tailgate 101 can be formed from a radar-transparent plastic if the sensor device 10 is arranged behind it. Furthermore, it is conceivable that a housing 20 and/or a cover element 21 for the sensor device 10 can also be formed from a radar-transparent plastic. Furthermore, it is conceivable that a housing 20 for the sensor device 10 and/or a cover element 21 and/or the outer skin of the tailgate 101 could be provided with a coating 22 (see FIGS. 6 and 7) in order to adapt the appearance of the sensor device 10 or the tailgate 101 to the appearance of the vehicle 100. The coating 22 can be a lacquer coat, a spray layer, or a layer deposited by means of gas phase deposition (CVD, PVD) or by means of sputtering. The coating 22 can comprise a material thickness between 10 nm and 100 nm.

Nevertheless, it is also conceivable that such a sensor device 10 could be arranged behind an emblem 102 of the vehicle 100. Furthermore, it is conceivable that the sensor device 10 could be arranged at a distance from the tailgate 101, for example in the region of a license plate 103, a bumper 104 and a diffuser or could be installed there. Also there, the sensor device 10 can be arranged open or covered.

As FIG. 1 shows and FIG. 5 schematically indicates, the sensor device 10 in the sense of the invention may be in a communication connection with a closing device 111 and/or a drive device 112 of the tailgate 101 of the vehicle 100 in order to control these devices accordingly and thus actuate the movable part 101, i.e. the tailgate 101. In doing so, the control unit 11 of the sensor device can transmit 10 different control signals for locking, unlocking, opening and/or closing the tailgate 101 depending on the sensed activation action H1, H2, H3, B1, B2.

The sensor device 10 in the sense of the invention may further be in a communication connection ID with a security device 110 of the vehicle 100 to verify a user's authorization to actuate the movable part 101 of the vehicle 100. Furthermore, it is possible that the sensor device 10 itself can carry out a security query. Thus, the sensor device 10 can form part of a keyless-go system or a keyless-entry system of the vehicle 100. For the communication connection ID with the security device 110 a wireless connection, for example by means of radio waves, or a wired connection, for example via a bus CAN, LVDS or automotive Ethernet can be used.

According to the invention, electromagnetic waves in the radio frequency range or radar waves are used by the sensor device 10 to actuate the movable part 101, in particular the tailgate 101 (locking, unlocking, opening and/or closing) of the vehicle 100. The sensor unit 12 of the sensor device 10 is used for transmitting and receiving the radar waves. The control unit 11 of the sensor device 10 is used for analyzing, evaluating and processing the radio waves. With the help of radar waves different activation actions H1, H2, H3, B1, B2 of a user in the first activation region A1 of the sensor device 10 can be sensed. For a given process to actuate the movable part 101, a corresponding activation action H1, H2, H3, B1, B2 may be provided. Radar waves can be used to recognize complex gestures and 2D and/or 3D movement patterns. In the case of radar waves, a specific activation region A1, A2, A3, comprising the bandwidth W1, W2 and the range D1, D2, D3 of the activation region A1, A2, A3, can be adjusted in a simple way, for example, by means of a corresponding transmission frequency and/or transmission pulse period, which may change at a certain interval, at the sensor unit 12. Thus, the sensor device 10 can adjust different activation regions A1, A2, A3. Such a sensor device 10 is also relatively resistant to environmental influences.

On the one hand, the invention allows the sensor device 10 to use its own sensor unit 12 to sense the at least one activation action H1, H2, H3, B1, B2 of the user.

On the other hand, it is possible within the scope of the invention that the sensor device 10 can use the existing sensor technology of the vehicle 100, for example of an assistance system of the vehicle 100, to monitor at least one first activation region A1 of the vehicle 100 for at least one activation action H1, H2, H3, B1, B2 of the user. An assistance system for automated or autonomous driving, parking and/or reversing can serve as a corresponding assistance system of the vehicle 100.

Furthermore, it is possible within the scope of the invention that the sensor device 10 with its own sensor unit 12 can provide a corresponding sensor technology for at least one assistance system of the vehicle 100.

The sensor data of the sensor unit 12 can be used either to actuate the movable part 101 or to control an assistance system of the vehicle 100. A strict separation between these operating modes I, II, III of the sensor unit 10 can be advantageously applied to ensure security in the operation of the vehicle 100. Since the movable part 101 of the vehicle 100 is mostly actuated when the vehicle 100 is stationary and the assistance systems of the vehicle 100 are mostly activated when the vehicle 100 is moving, it may be advantageous to use the sensor device 10 either to actuate the movable part 101 of the vehicle 100 or to drive the vehicle 100 with assistance and/or autonomously, depending on the velocity V of the vehicle 100.

Within the scope of the invention, it is conceivable that the sensor device 10 may comprise at least one first operating mode I, a second operating mode II and/or a third operating mode III.

As shown in FIGS. 2 and 3, the first operating mode I can be activated to actuate the movable part 101 of the vehicle 100, and thus to control the closing device 111 and/or the drive device 112 of the tailgate 101. A prerequisite for the first operating mode I may be, for example, that the vehicle 100 is stationary or almost stationary or moving at a low velocity V below 3 km/h. This can provide the security that the tailgate 101 of vehicle 100 will not be opened unintentionally when the vehicle 100 is moving. Thus, the actuation of the movable part 101 of the vehicle 100 can safely only take place when the vehicle 100 is stationary or almost stationary (for example after parking).

In the first operating mode I of the sensor device 10, the sensor unit 12 can be assigned a transmission frequency in the frequency range between 76 GHz and 77 GHz (Long Range Radar or LRR). In this way, the sensor unit 12 can monitor the surroundings of the vehicle 100 using long-range radar waves. This can be advantageous for assistance systems with a first range D1 of up to 250 m. However, a high first range D1 can also be advantageous for recognizing a user approaching the vehicle 100.

The second operating mode II of the sensor device 10 can again be activated with a moving vehicle 100 at a velocity V between 3 km/h and 30 km/h, in particular between 3 km/h and 20 km/h, preferably between 3 km/h and 10 km/h. This situation is not shown in the figures. Such a situation is conceivable when the vehicle 100 is moving relatively slowly, for example when parking. In this second operating mode II, the sensor device 10 can be combined with an assistance system for automated parking.

In the second operating mode II of the sensor unit 10, the sensor unit 12 can be assigned a transmission frequency in the frequency range between 77 GHz and 81 GHz (Short Range Radar or SRR). This can be advantageous for assistance systems with a second range D2 of up to 70 m.

But also in the first operating mode I, the second range D2 can be advantageous to limit the first activation region A1 and still allow a fast sequence when actuating the tailgate 101.

The third operating mode III of the sensor device 10 can in turn be activated with a moving vehicle 100 from a velocity V from 10 km/h, in particular from 20 km/h, preferably from 30 km/h. This is the velocity range which can be advantageous for certain assistance systems of the vehicle 100, for example assistance systems for reverse parking. In such assistance systems, the sensor device 10 according to the invention can be used directly or indirectly.

In the third operating mode III of the sensor unit 10, the sensor unit 12 can be assigned a transmission frequency in the frequency range between 77 GHz and 81 GHz (Ultra Short Range Radar or USRR). This can be advantageous for assistance systems with a third range D3 of up to 30 m.

But also in the first operating mode I, the third range D3 can be advantageous to limit the first activation region A1 even further and still allow a fast sequence when actuating the tailgate 101.

Within the scope of the invention it is further conceivable that certain assistance systems can use the information of the sensor device 10 according to the invention in the second operating mode II and other assistance systems can use the information of the sensor device 10 according to the invention in the third operating mode III of the sensor device 10.

Within the scope of the invention, the control unit 11 may be designed to control at least one assistance system of the vehicle 100 or can be at least designed to transmit information of the sensor unit 12 to at least one assistance system of the vehicle 100.

As further shown in FIGS. 1 and 6, the sensor unit 12 can be designed for a distance measurement D, a velocity measurement G and/or an angle measurement W within the first activation region A1 and/or a second activation region A2 and/or a third activation region A3. In this way, the sensor unit 12 can be used to collect information which may be useful for the operation of at least one assistance system of the vehicle 100 in the second operating mode II or in the third operating mode III of the sensor device 10.

As further shown in FIGS. 2 and 3, different bandwidths W1, W2, for example a first bandwidth W1 or a second bandwidth W2, may be assigned to the sensor unit 12 in at least one, in several or in all operating modes I, II, III of the sensor device 10. The respective bandwidth W1, W2 can easily determine the width of the respective activation region A1, A2, A3. The activation regions A1, A2, A3 can, for example, be designed in the form of sensing lobes. Different bandwidths W1, W2 can be advantageous for different functions. For example, a narrow activation region A1, A2, A3 can be advantageous for distance regulation for reverse parking. For another assistance system or for actuating the movable part 101, a wide activation region A1, A2, A3 can be advantageous to enable comprehensive monitoring of the activation region A1, A2, A3.

As further shown in FIGS. 2 and 3, the sensor unit 12 can sense a presence H1 and/or an approach H2 and/or a leg and/or foot movement H3 of the user as the at least one activation action H1, H2, H3, B1, B2 in the first activation region A1. In addition, the sensor unit 12 can be designed to sense at least one first movement pattern B1 or one second movement pattern B2 by a hand of the user as the at least one activation action H1, H2, H3, B1, B2 in the first activation region A1. In this way, the sensor device 10 can be used in combination with different technologies to actuate the movable part 101.

As mentioned above in the description of FIG. 1, the control unit 11 can be designed to request a user access authorization or can be in a communication connection ID with a security device 110 of the vehicle to verify a user access authorization.

According to an embodiment of the invention, it is conceivable that the control unit 11 may be designed to execute or cause a query of an access authorization of the user if, by means of the sensor unit 12, a presence H1 and/or an approach H2 of the user has been sensed as the at least one activation action H1, H2, H3, B1, B2 in the first activation region A1.

Furthermore, it is conceivable that the control unit 11 can be awakened by the security device 110 of the vehicle 100 in order to monitor the first activation region A1 for at least one activation action H1, H2, H3, B1, B2 by means of the sensor unit 12.

If an authorized user is subsequently recognized by the control unit 11 and/or verified by a vehicle-side control device, the sensor unit 12 can monitor the first activation region A1 for a specific leg and/or foot movement H3 of the user and/or a first movement pattern B1 and a second movement pattern B2 by a hand of the user. When the user has performed a suitable leg and/or foot movement H3 and/or a suitable first movement pattern B1 and a suitable second movement pattern B2, the tailgate 101 can be actuated. For this purpose, the control unit 11 can transmit appropriate control signals to the closing device 111 and/or the drive device 112 of the tailgate 101.

The leg and/or foot movement H3 of the user can be determined in the form of a movement with one leg of the user towards the movable part 101 and a kicking movement with one foot under the movable part 101 (see the arrows in FIGS. 3 and 4). Another conceivable leg and/or foot movement H3 of the user can be determined in the form of a rocking movement with one foot under the movable part 101 (see the arrows in FIG. 2).

Furthermore, the control unit 11 can be designed to actuate the movable part 101 if a first movement pattern B1 and a second movement pattern B2 have been sensed in succession as the at least one activation action H1, H2, H3, B1, B2 in the first activation region A1 (see the arrow in FIG. 2).

As further shown in FIG. 2, the first movement pattern B1 can be determined in the form of a stroke movement with one hand in a first direction along the movable part 101 and the second movement pattern B2 can be determined in the form of a stroke movement with one hand in a second direction along the movable part 101. The first direction and the second direction can be essentially horizontal and/or opposite (see FIGS. 3 and 4).

As further shown in FIG. 4, in the first operating mode I, the sensor device 10 can be designed to stop actuation of the movable part 101 if the sensor unit 12 senses an obstacle that prevents actuation of the movable part 101. Thus, the movable part 101 can be operated safely.

As FIG. 5 further shows, the sensor device 10 can be arranged on the movable part 101 itself, on an emblem 102, on a license plate 103, on a bumper 104 or on a diffuser of the vehicle 100.

As FIGS. 2 to 5 indicate, several sensor devices 10 may be provided within the scope of an actuating device 30 for the movable part 101 to actuate the movable part.

It can be seen that at least one sensor device 10 can be provided for monitoring at least one first activation region A1 in the region of the tailgate 101, for example on the tailgate itself, on an actuating device 30 for the tailgate 101 or on an emblem 104 of the vehicle 100. The first activation region A1 can comprise an essentially horizontal extension.

An additional or alternative sensor device 10 with a horizontal activation region A1 can be provided in the region of the license plate 103.

An even further or alternative sensor device 10 with a horizontal activation region A1 can be provided in the region of the bumper 104 or a diffuser of the vehicle 100.

Already by using several different sensor devices 10 with horizontal activation regions A1, complicated movement patterns B1, B2 and/or leg and/or foot movements H3 can be recognized with high accuracy.

In addition, a further sensor device 10 may be provided in the region of the bumper 104 or of a diffuser of the vehicle 100, which may be designed to monitor a further switching region S1 of the movable part 101 of the vehicle 100, which may comprise an essentially vertical extension. Advantageously, the monitoring in the vertical switching range S1 of the movable part 101 of the vehicle 100 may be used to confirm that the user actually intends to actuate the tailgate 101. For this purpose, the user can perform a kicking movement with his foot. However, it is also conceivable that the vertical switching region S1 can be used to sense a rocking movement with the foot under the movable part 101.

According to a particular advantage of the invention, one sensor device 10 may be sufficient to recognize different activation actions H1, H2, H3, B1, B2 of the user. Furthermore, the invention may provide several alternative locations and/or combinations for one or more sensor devices 10 in order to extend the range of application and functionality and the activation device 30.

As further shown in FIGS. 1, 6 and 7, a possible embodiment of the sensor device 10 may provide at least one additional sensor unit 13 to sense the at least one activation action H1, H2, H3, B1, B2 of the user by means of electromagnetic waves in the optical frequency range or in the infrared range or by means of a capacitive measurement. Thus, a combination sensor technology can be provided as part of a sensor device 10.

Furthermore, FIGS. 6 and 7 show that the sensor device 10 with the control unit 11, the sensor unit 12, and possibly another sensor unit 13, can be designed as a modular assembly to simplify the assembly of the sensor device 10.

Furthermore, FIGS. 1, 6 and 7 show that the sensor device 10 can comprise a carrier plate 3 for the control unit 11, the sensor unit 12, and possibly another sensor unit 13. Thus, an easy assembly of the sensor device 10 can be provided.

In addition, FIGS. 1, 6 and 7 show that the sensor unit 12 can comprise at least one or more, for example two or three transceivers 2. Each transceiver 2 can comprise at least one, preferably two, transmitting antennas SA and at least one, preferably four, receiving antennas EA. This provides improved recognition of different movement patterns B1, B2.

Furthermore, FIGS. 1, 6 and 7 show that the control unit 11 can comprise at least one microcontroller 1. FIG. 1 also shows that the microcontroller 1 further comprises at least one converter ADC, DAC, at least one signal processing unit SPT, at least one processor unit CPU, at least one memory unit RAM, at least one interface IF for further peripheral functions and/or at least one terminal CAN for communication and/or energy supply of the sensor device 10 with a voltage U, V. The microcontroller 1 can process and analyze the information of the sensor unit 12 to provide different operating modes of the sensor device 10.

Furthermore, FIGS. 6 and 7 show that a housing 20 can be provided for the sensor device 10 to receive the sensor device 10 protected from environmental and/or weather influences.

As shown in FIG. 6, the housing 20 can completely enclose the sensor device 10. Thus, the sensor device 10 can be received particularly protected and safely.

According to the embodiment of FIG. 7, the housing 20 for the sensor device 10 can comprise a cover element 21, which can be preferably opened, through which the sensor device 10 can be inserted into the housing 20 and/or removed for repair. The cover element 21 may be fixed to the housing 20 in a removable, rotatable (e.g. by means of a hinged connection, e.g. in the form of a hinge) or movable (e.g. by means of a labyrinth guide) manner.

Nevertheless, it is also conceivable that the cover element 21 in the context of the invention may be used to close an opening in an outer skin of the movable part 101, of a license plate 103, of a bumper 104 or of a diffuser of the vehicle 100.

It is further conceivable that the cover element 21 can be arranged behind an outer skin of the movable part 101, of a license plate 103, of a bumper 104 or of a diffuser of the vehicle 100. It is also conceivable that the cover element 21 for the housing 20 could be designed in the form of an emblem 102 of the vehicle 100.

The housing 20 for the sensor unit 10 and/or the cover element 21 may be formed from a radar-transparent material, in particular plastic, preferably polymer, so as not to impair the functioning of the sensor unit 12.

The housing 20 for the sensor device 10 and/or the cover element 21 and/or the outer skin of the respective movable component may be provided at least partially with a coating 22 (see FIGS. 6 and 7). The coating 22 can comprise a material thickness of 10 nm to 100 nm. The coating 22 can, for example, be in the form of a lacquer coat, a spray layer or a layer deposited by means of gas phase deposition or by means of sputtering. The coating 22 may also comprise metal particles, preferably chromium, and/or a semiconductor material, preferably silicon, to obtain a metallic appearance.

As FIG. 6 further shows, at least one or more assembling means 23 may be provided within the housing 20 for the sensor device 10 to receive the sensor device 10 in a form- and/or force-locking manner and to facilitate the assembly of the sensor device 10. As assembling means 23, different engaging and/or clamping and/or guiding means are conceivable, for example in the form of a circumferential groove 23 for the carrier plate 3 of the sensor device 10. The carrier plate 3 can simply be inserted into the groove 23.

As further shown in FIG. 7, the housing 20 for the sensor device 10 may comprise at least one or more fixing means 24, for example in the form of engaging and/or clamping and/or guiding means, which may interact with corresponding counter-engaging means in order to fix the sensor device 10 in a form- and/or force-locking manner to a non-shown vehicle-side opening and/or to a non-shown vehicle-side carrier element.

The above description of the figures describes the present invention exclusively in the context of examples. Of course, individual features of the embodiments can be freely combined with each other, provided it is technically reasonable, without leaving the scope of the invention.

LIST OF REFERENCE SIGNS 10 sensor device
11 control unit
12 sensor unit
13 further sensor unit
20 housing
21 cover element
22 coating
23 assembling means, groove
24 fixing means
30 actuating device
100 vehicle
101 movable part, tailgate
102 emblem
103 license plate
104 bumper
110 security device
111 closing device
112 drive device
A1 first activation region
A2 second activation region
A3 third activation region
H1, H2, H3, B1, B2 activation action
B1 first movement pattern
B2 second movement pattern
H1 presence
H2 approach
H3 leg and/or foot movement
D distance measurement
G velocity measurement
W angle measurement
D1 first range
D2 second range
D3 third reach
O obstacle
W1 first bandwidth
W2 second bandwidth
U voltage
V velocity
I first operating mode
II second operating mode
III third operating mode
1 microcontroller
2 transceiver
3 carrier plate
ID communication connection
SAS transmitting antenna
EA receiving antenna
ADC analog-digital converter
DAC digital-analog converter
SPT signal processing unit
CPU processor unit
RAM memory unit
IF interface
CAN terminal for communication and/or energy supply

The invention claimed is:

1. A sensor device for a vehicle, comprising:
a control unit for actuating a movable part of the vehicle, and a sensor unit for monitoring at least one first activation region,
wherein the control unit is configured to actuate the movable part of the vehicle,
when at least one activation action of a user in the first activation region has been sensed by the sensor unit, wherein
the sensor unit is configured to sense the at least one activation action of the user by means of electromagnetic waves in a radio frequency range, and
the sensor device is configured to be used depending on the speed of the vehicle:
either for actuating the movable part of the vehicle, or
for at least assisted or autonomous driving of the vehicle.

2. The sensor device according to claim 1,
wherein
the control unit is configured to control at least one assistance system of the vehicle,
or the control unit can be brought into a communication connection with a vehicle-side control device of the at least one assistance system of the vehicle
or
the sensor unit is configured for at least a distance measurement, a velocity measurement or an angle measurement within at least the first activation region or a second activation region or a third activation region.

3. The sensor device according to claim 1,
wherein
at least the sensor device comprises at least one first operating mode, a second operating mode or a third operating mode, and
at least the first operating mode can be activated when the vehicle is stationary, the second operating mode can be activated when the vehicle is moving at a velocity between 3 km/h and 30 km/h and the third operating mode can be activated from a velocity from 10 km/h.

4. The sensor device according to claim 1,
wherein
at least in at least one operating mode the sensor device is operable to sense the at least one activation action of the user in the first activation region,
or in at least one operating mode the sensor device is operable for at least a distance measurement, a velocity measurement or an angle measurement within at least the first activation region or a second activation region or a third activation region
or in at least one operating mode the sensor device is operable to sense an obstacle when the movable part of the vehicle is actuated.

5. The sensor device according to claim 1,
wherein
at least in the first operating mode of the sensor device, the sensor unit is assigned a transmission frequency in the frequency range between 76 GHz and 77 GHz,
or in the second operating mode of the sensor device, the sensor unit is assigned a transmission frequency in the frequency range between 77 GHz and 81 GHz,
or in the third operating mode of the sensor device, the sensor unit is assigned a transmission frequency in the frequency range between 77 GHz and 81 GHz.

6. The sensor device according to claim 1,
wherein
at least in at least one operating mode of the sensor device the sensor unit is assigned a first range in the range of approximately 250 m,
or in at least one operating mode of the sensor device the sensor unit is assigned a second range in the range of approximately 70 m,
or in at least one operating mode of the sensor device the sensor unit is assigned a third range in the range of approximately 30 m.

7. The sensor device according to claim 1,
wherein
in at least one operating mode of the sensor device a first bandwidth or a second bandwidth is assigned to the sensor unit
or
at least the sensor unit is configured to sense at least a presence or an approach or at least a leg or foot movement of the user as the at least one activation action in the first activation region,
or the sensor unit is configured to sense at least one first movement pattern or one second movement pattern by a hand of the user as the at least one activation action in the first activation region.

8. The sensor device according to claim 1,
wherein
the control unit is configured for a security query of the user,
or the control unit can be brought into a communication connection with a security device of the vehicle in order to verify an access authorization of the user
or
the control unit is configured to execute or initiate a security query of the user when, by means of the sensor unit, at least a presence or an approach of the user has been sensed as the at least one activation action in the first activation region,
or the control unit can be switched on by a security device of the vehicle in order to monitor the first activation region for at least one activation action by means of the sensor unit.

9. The sensor device according to claim 1,
wherein
the control unit is configured to actuate the movable part when, by means of the sensor unit, at least a leg or foot movement of the user has been sensed as the at least one activation action in the first activation region
or
at least the control unit is configured to sense at least the leg or foot movement of the user in a form of a movement with one leg of the user towards the movable part and a kicking movement with one foot under the movable part,
or the control unit is configured to sense at least the leg or foot movement of the user in a form of a rocking movement with one foot under the movable part.

10. The sensor device according to claim 1,
wherein
the control unit is configured to actuate the movable part when a first movement pattern and a second movement pattern have been successively sensed as the at least one activation action in the first activation region
or
the control unit is configured to sense the first movement pattern in a form of a stroke movement with one hand in a first direction along the movable part and the second movement pattern in a form of a stroke movement with one hand in a second direction along the movable part.

11. The sensor device according to claim 1,
wherein
the control unit is configured to stop actuation of the movable part if an obstacle has been sensed which blocks the actuation of the movable part
or
at least one further sensor unit is provided to sense the at least one activation action of the user by means of electromagnetic waves in an optical frequency range or in an infrared range or by means of capacitive measurement
or
the sensor device can be arranged on the movable part, on an emblem, on a license plate, on a bumper or on a diffuser of the vehicle.

12. The sensor device according to claim 1,
wherein
at least the sensor device with the control unit, the sensor unit, and possibly a further sensor unit, is configured in a form of a modular assembly,
or the sensor device comprises a carrier plate for the control unit, the sensor unit, and possibly a further sensor unit.

13. The sensor device according to claim 1,
wherein
the sensor unit comprises at least one transceiver
or
the control unit comprises at least one microcontroller
or at least a housing is provided for the sensor device in order to receive the sensor device protected from at least environmental or weather influences, or the housing completely encloses the sensor device.

14. The sensor device according to claim 13,
wherein
at least the housing for the sensor device comprises a cover element through which the sensor device can be inserted within the housing, or an opening in an outer skin of the movable part, of a license plate, of a bumper or of a diffuser of the vehicle can be closed by the cover element, or the cover element for the housing is configured in a form of an emblem of the vehicle or at least the housing for the sensor device or the cover element is formed from a radar-transparent material or at least the housing for the sensor device or the cover element is provided at least partially with a coating, or the coating comprises at least metal particles or a semiconductor material.

15. The sensor device according to claim 13,
wherein
at least the housing for the sensor device comprises at least one or more assembling means for receiving the sensor device within the housing in at least a form- or force-locking manner, or the assembling means are configured to clamp a carrier plate of the sensor device inside the housing, or the assembling means comprise a circumferential groove for the carrier plate of the sensor device, into which the carrier plate can be inserted.

16. The sensor device according to claim 13,
wherein
at least the housing for the sensor device comprises at least one or more fixing means for fixing the sensor device in at least a form- or force-locking manner at least to a vehicle-side opening or to a vehicle-side carrier element or behind an outer skin of the movable part, of an emblem, of a license plate, of a bumper or of a diffuser of the vehicle, or the fixing means comprise engaging means which can be brought into mechanical operative connection with corresponding counter-engaging means at least on a vehicle-side opening or on a vehicle-side carrier element, or the fixing means comprise a guiding rail in order to simply push in the sensor device at a vehicle-side opening or at a vehicle-side carrier element.

17. An actuating device for a movable part of a vehicle, comprising at least one sensor device comprising:
a control unit for actuating a movable part of the vehicle, and a sensor unit for monitoring at least one first activation region,
wherein the control unit is configured to actuate the movable part of the vehicle,
when at least one activation action of a user in the first activation region has been sensed by the sensor unit,
wherein
the sensor unit is configured to sense the at least one activation action of the user by means of electromagnetic waves in a radio frequency range, and
the sensor device is configured to be used depending on the speed of the vehicle:
either for actuating the movable part of the vehicle, or for at least assisted or autonomous driving of the vehicle.

18. The actuating device according to claim 17,
wherein
at least a sensor device for monitoring at least one first activation region and a further sensor device for monitoring a further switching region of the movable part of the vehicle are provided,
or the first activation region comprises an essentially horizontal extension and the further switching region comprises an essentially vertical extension.

19. A method for operating a sensor device for a vehicle,
wherein
the sensor device is operated in at least one operating mode for sensing at least one activation action of a user in a first activation region in order to actuate a movable part of the vehicle,
and the sensor device is operated in at least one operating mode for at least a distance measurement, a velocity measurement or an angle measurement within at least the first activation region or a second activation region or a third activation region in order to control at least one assistance system of the vehicle,
wherein
the sensor device is used depending on the speed of the vehicle:
either for actuating the movable part of the vehicle, or for at least assisted or autonomous driving of the vehicle.

20. The method according to claim 19,
wherein
the sensor device uses electromagnetic waves in a radio frequency range to sense the at least one activation action of a user in the first activation region and for at least a distance measurement, a velocity measurement or an angle measurement within at least the first activation region or a second activation region or a third activation region.

* * * * *